United States Patent
Hu et al.

(10) Patent No.: US 6,644,688 B1
(45) Date of Patent: Nov. 11, 2003

(54) CRASH SENSING SYSTEM

(75) Inventors: Jialou Hu, West Bloomfield, MI (US); Gopal Narwani, Warren, MI (US)

(73) Assignee: Automotive Systems Labortory, Inc., Farmington Hills, MI (US)

( * ) Notice: Subject to any disclaimer, the term of this patent is extended or adjusted under 35 U.S.C. 154(b) by 0 days.

(21) Appl. No.: 09/706,938

(22) Filed: Nov. 6, 2000

Related U.S. Application Data (60) Provisional application No. 60/163,599, filed on Nov. 4, 1999.

(51) Int. Cl.$^7$ .............................................. B60R 21/32
(52) U.S. Cl. ........................................ 280/735; 701/45
(58) Field of Search ............................ 280/735; 701/45

(56) References Cited

U.S. PATENT DOCUMENTS

| | | | |
|---|---|---|---|
| 2,552,722 A | 5/1951 | King ............................. 264/1 |
| 3,708,231 A | 1/1973 | Walters ..................... 356/152.1 |
| 3,718,332 A | * 2/1973 | Jones .......................... 280/735 |
| 3,794,136 A | * 2/1974 | Okada ......................... 280/735 |
| 3,945,459 A | 3/1976 | Oishi et al. .................. 180/274 |
| 3,998,552 A | 12/1976 | Stewart et al. ............... 356/103 |
| 4,087,782 A | 5/1978 | Oishi et al. .................. 180/271 |
| 4,110,610 A | 8/1978 | Mueller et al. ........ 250/231 SE |
| 4,154,529 A | 5/1979 | Dyott ........................... 356/28 |
| 4,200,379 A | 4/1980 | Erlichman .................... 396/66 |
| 4,291,976 A | 9/1981 | McMahon ................... 356/150 |
| 4,319,134 A | 3/1982 | Weber ......................... 250/231 |
| 4,586,260 A | 5/1986 | Baxter et al. .................. 33/706 |
| 4,866,418 A | 9/1989 | Dobler et al. ............... 340/429 |
| 4,947,166 A | 8/1990 | Wingate et al. ............... 341/13 |
| 4,991,301 A | 2/1991 | Hore ........................... 33/366 |
| 5,051,567 A | 9/1991 | Tedesco ....................... 235/462 |
| 5,179,256 A | * 1/1993 | Haglund ...................... 280/735 |
| 5,200,800 A | 4/1993 | Suda et al. ................... 356/401 |
| 5,235,408 A | 8/1993 | Matsugu et al. ............. 356/401 |
| 5,281,780 A | 1/1994 | Haland ....................... 200/52 R |
| 5,371,598 A | 12/1994 | Ghaem et al. ............... 356/373 |
| 5,389,777 A | 2/1995 | Chin ...................... 250/214 PR |
| 5,392,024 A | * 2/1995 | Kiuchi et al. ................ 280/735 |
| 5,430,334 A | 7/1995 | Meister ...................... 307/10.1 |
| 5,445,412 A | * 8/1995 | Gillis et al. .................. 180/268 |
| 5,504,379 A | 4/1996 | Mazur et al. ............... 307/10.1 |
| 5,543,988 A | 8/1996 | Brady et al. ................. 360/112 |
| 5,544,716 A | * 8/1996 | White .......................... 180/274 |
| 5,570,903 A | 11/1996 | Meister et al. ............... 280/735 |
| 5,580,084 A | 12/1996 | Gioutsos ..................... 280/735 |
| 5,692,775 A | 12/1997 | Foo ............................. 280/735 |
| 5,702,124 A | 12/1997 | Foo et al. ................. 701/45 X |
| 5,793,200 A | 8/1998 | Berrill ..................... 324/207.2 |
| 5,797,623 A | * 8/1998 | Hubbard ...................... 280/735 |
| 5,841,132 A | 11/1998 | Horton et al. .......... 250/231.13 |
| 5,904,730 A | * 5/1999 | Yamazaki et al. ........... 701/301 |
| 6,009,970 A | * 1/2000 | Breed ......................... 180/274 |
| 6,020,812 A | * 2/2000 | Thompson et al. ......... 180/273 |
| 6,036,225 A | 3/2000 | Foo et al. .................... 280/735 |

(List continued on next page.)

Primary Examiner—Lesley D. Morris
Assistant Examiner—L. Lum
(74) Attorney, Agent, or Firm—Dinnin & Dunn, P.C.

(57) ABSTRACT

The severity of a crash is discriminated from a measure of relative motion of first and second elements of a vehicle, wherein an initial time is recorded when a variable point in the associated phase space of relative velocity and relative displacement crosses a first threshold boundary, and a safety restraint actuator is actuated if a subsequent time when the variable point crosses a second threshold boundary is within threshold period following the initial time. In accordance with another aspect, a type of impacting object is discriminated from a first measure of relative motion at a first location, and a crash severity is discriminated from a second measure of relative motion at a second location, wherein the relative motion at the first location is unipolar for one type of crash and bipolar for another, and the relative motion at the second location is unipolar for both types of crashes. The second threshold boundary can be responsive to discrimination of the type of impacting object by the first relative motion sensor.

42 Claims, 8 Drawing Sheets

U.S. PATENT DOCUMENTS

| | | | |
|---|---|---|---|
| 6,039,345 A | 3/2000 | Cech et al. | 280/735 |
| 6,095,553 A * | 8/2000 | Chou et al. | 280/735 |
| 6,095,554 A * | 8/2000 | Foo et al. | 280/735 |
| 6,186,539 B1 * | 2/2001 | Foo et al. | 280/735 |
| 6,203,060 B1 * | 3/2001 | Cech et al. | 280/735 |
| 6,204,756 B1 * | 3/2001 | Senyk et al. | 340/438 |
| 6,206,129 B1 * | 3/2001 | Breed et al. | 180/274 |
| 6,209,909 B1 * | 4/2001 | Breed | 280/735 |
| 6,212,454 B1 * | 4/2001 | Foo et al. | 701/45 |
| 6,234,519 B1 * | 5/2001 | Breed | 280/735 |

* cited by examiner

CRASH SENSING SYSTEM

CROSS-REFERENCE TO RELATED APPLICATIONS

The instant application claims the benefit of prior U.S. Provisional Application Ser. No. 60/163,599 filed on Nov. 4, 1999. This application is incorporated herein by reference.

DESCRIPTION OF EMBODIMENT(S)

Figure 1:
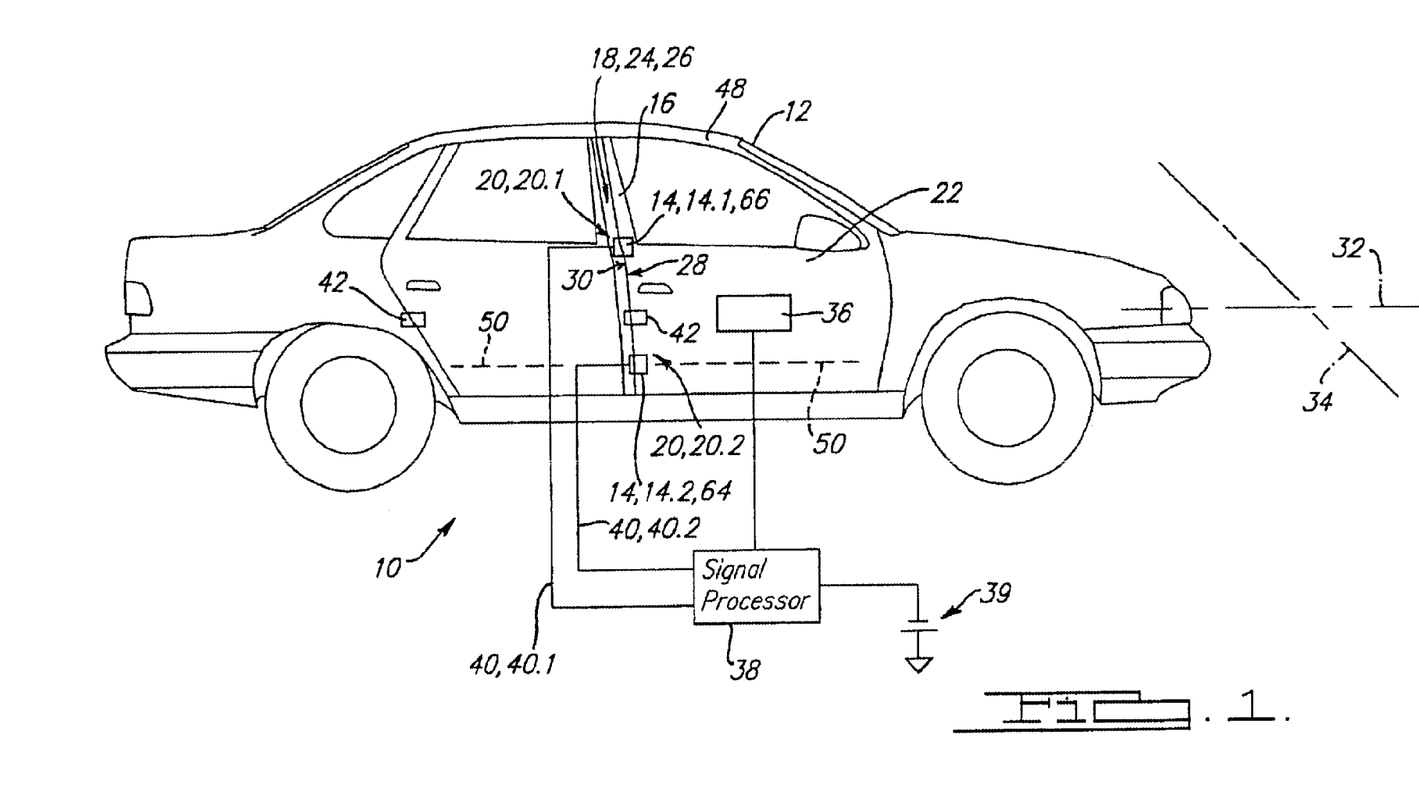
FIG. 1 illustrates an example of a side-view of a vehicle incorporating the instant invention.

Referring to FIG. 1, a crash sensing system 10 operatively coupled to a vehicle 12 incorporates at least one relative motion sensor 14 to measure a relative motion of a first element 16 of the vehicle 12 with respect to a second element 18 of the vehicle 12 proximate to a location 20 of the measurement. For example, in a side-impact crash sensing system 10, the first 16 and second 18 elements comprise, for example, a vehicle door 22 and a fixed portion 24 of the vehicle 12 proximate thereto, for example, a pillar 26, wherein the relative motion sensor 14 measures the relative motion of respective points or locations on the door edge 28 and the adjoining pillar edge 30. The vehicle 12 has a longitudinal axis 32 along the front-to-rear direction and a lateral axis 34 along the side-to-side direction, and is equipped with a side-impact safety restraint system 36 for mitigating injury to an occupant from a side-impact crash.

The at least one relative motion sensor 14 is operatively connected to a signal processor 38—powered by a source of power 39—that controls the safety restraint system 36 responsive to the discrimination of a crash from at least one signal 40 from the at least one relative motion sensor 14.

In accordance with one aspect, the crash sensing system 10 comprises first 14.1 and second 14.2 relative motion sensors located so as to measure the relative motion of first 16 and second 18 elements of the vehicle 12 at distinct respective first 20.1 and second 20.2 locations.

Figure 2A:
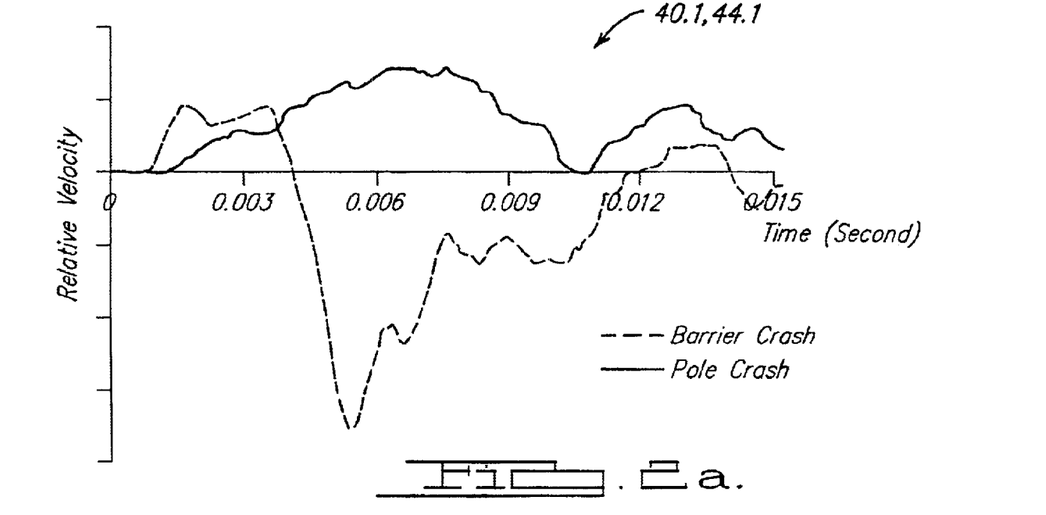
FIG. 2a illustrates for various crashes the associated relative velocity signals from a first relative motion sensor.
Figure 2B:
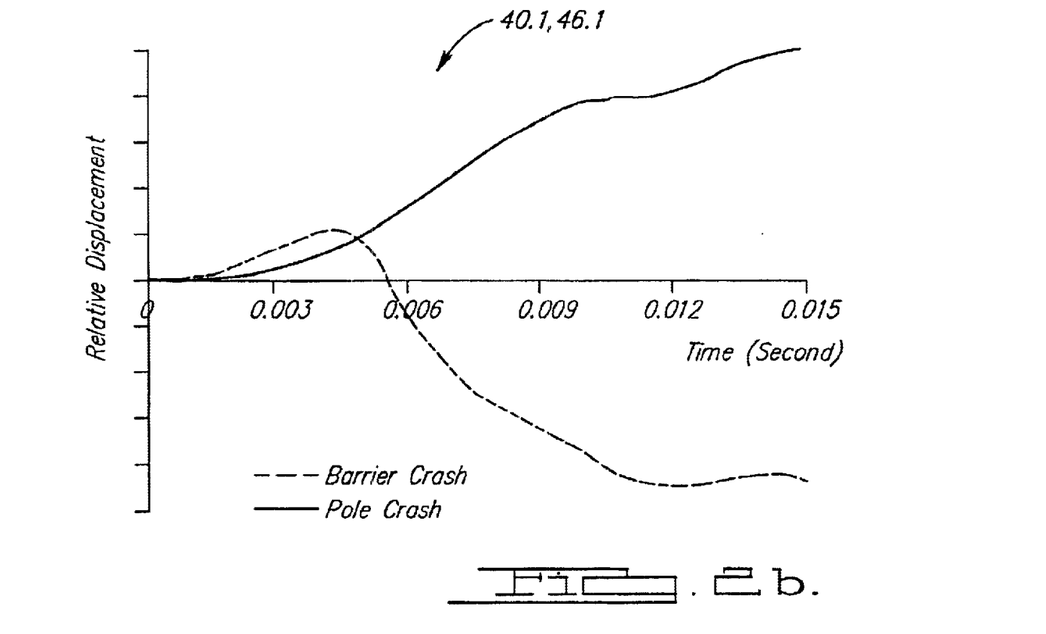
FIG. 2b illustrates for various crashes the associated relative displacement signals from the first relative motion sensor.

Referring to FIGS. 2a and 2b, for a side-impact crash sensing system 10, the first relative motion sensor 14.1 at an appropriate first location 20.1 above the striker-latch 42 of the vehicle door 22 provides a first signal 40.1 having different types of responses to different types of crashes, from which type of response an associated type of crash may be distinguished. For example, a broad bumper/barrier impact may be distinguished from concentrated pole loading with respect to the relative velocity 44.1 and relative displacement 46.1 in the lateral direction, wherein a broad bumper/barrier impact generally involves a contact with a lower portion of the vehicle door 22 and a pole impact generally involves a contact along the side of the vehicle door 22 extending up to roof line. As illustrated in FIGS. 2a and 2b, at some point in time the direction of relative motion of the door edge 28 relative to a proximal portion of the associated pillar edge 30 responsive to a barrier crash is opposite to that of a pole crash at a location above the striker-latch 42. Responsive to a barrier crash, the door edge below the striker-latch 42 moves in the direction of the barrier impact—i.e. away from the barrier—and the door edge above the striker-latch 42 initially moves in the same direction but then moves in an opposite direction as the inward deformation of the door below the striker-latch 42 causes a portion of the door above the striker-latch 42 to move outward responsive to a rotation of the door about the striker-latch 42. Responsive to a pole crash involving a central or upper portion of the door, the pole causes the entire door—above and below the striker-latch 42—to move in the direction of barrier impact relative to the door frame 48, as the door wraps around the pole. The particular location to sense the reversal of relative movement responsive to a barrier crash for a given vehicle 12 depends on the associated structural details and door attachments of the vehicle 12, and upon the gap between the pillar 26 and the door edge 28 for hardware packaging.

Generally, for a side-impact crash sensing system 10, the first relative motion sensor 14.1 is located within a zone above the striker-latch 42 within which the associated lateral motion signal exhibits a different direction (or polarity) for different types of crashes. The location of the first relative motion sensor 14.1 relative to the striker-latch 42 can affect the time needed to sense a crash, wherein the crash sensing time generally increases with increasing distance. Accordingly, the first relative motion sensor 14.1 would be mounted sufficiently far from the striker-latch 42 so as to provide a signal from which the type of crash can be discriminated, and sufficiently close so as to provide for relatively fast crash sensing, wherein the actual distance is dependent upon the structural characteristics of the vehicle.

The first relative motion sensor 14.1 may be constructed and operated in accordance with various sensing technologies, including but not limited to bar code sensing, magnetic induction sensing, or other optical, mechanical or electronic relative motion sensing technologies, as known to one of ordinary skill in the art, including the measurement of relative motion by calculating displacement from acceleration measurements at separate locations—by integrating the separate acceleration measurements—and calculating the relative motion from the difference of the respective calculated displacements.

Figure 3A:
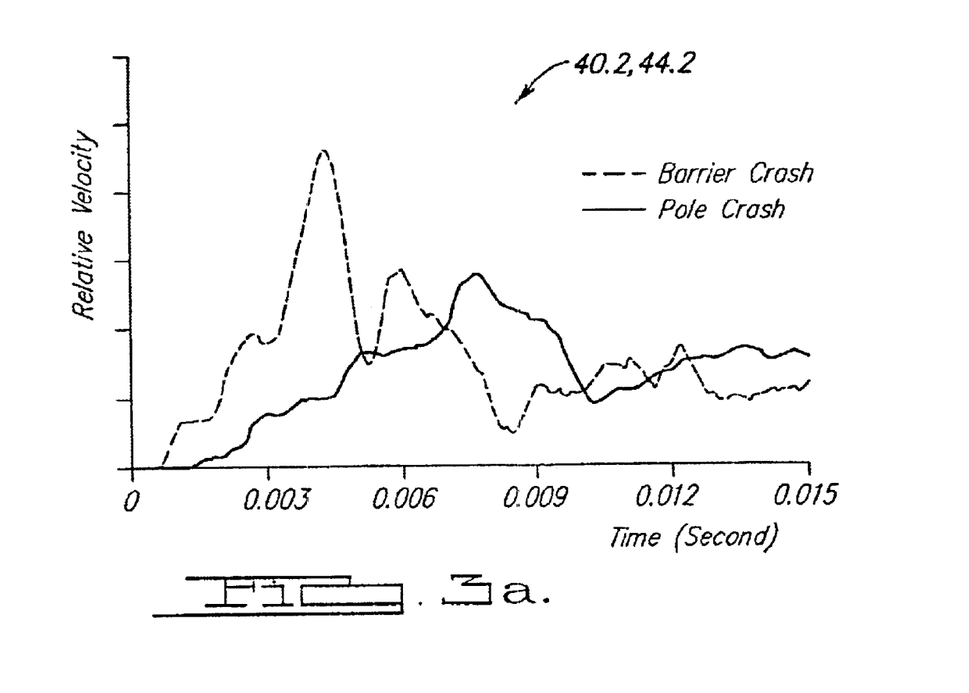
FIG. 3a illustrates for various crashes the associated relative velocity signals from a second relative motion sensor.
Figure 3B:
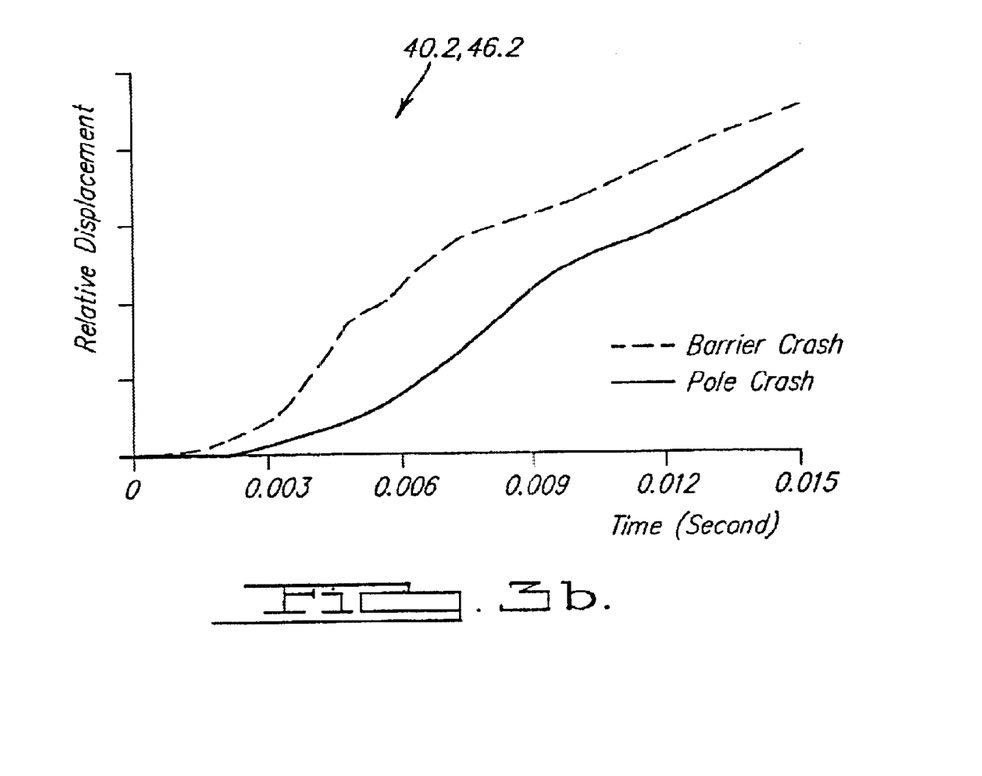
FIG. 3b illustrates for various crashes the associated relative displacement signals from the second relative motion sensor.

Referring to FIGS. 3a and 3b, for a side-impact crash sensing system 10, the second relative motion sensor 14.2 at an appropriate second location 20.2 below the striker-latch 42 of the vehicle door 22 provides a second signal 40.2 having a similar type of response for different types of crashes. For example, the motion at an appropriate location below the striker-latch 42 is responsive in a similar way or direction to both pole and barrier crashes. The second signal 40.2 provides information from which the associated crash severity may be detected, for example, from a measure that is dependent upon either the relative velocity 44.2— illustrated in FIG. 3a—or the relative displacement 46.2— illustrated in FIG. 3b,—or both. The best, or useful, particular second location 202, or associated range of possible locations, is generally dependent upon the structural characteristics of the vehicle 12, and is preferably close to a door reinforcement beam 50 below the striker-latch 42, which helps to transfer force to the second location 20.2 so as to cause an associated relative motion that results in a clear and reliable signal.

The second relative motion sensor 14.2 may be constructed and operated in accordance with various sensing technologies, including but not limited to bar code sensing or other optical, mechanical or electronic relative motion sensing technologies capable of measuring a one-dimensional component of three-dimensional motion, as known to one of ordinary skill in the art, including the measurement of relative motion by calculating displacement from acceleration measurements at separate locations—by integrating the separate acceleration measurements—and calculating the relative motion from the difference of the respective calculated displacements.

The first 14.1 and second 14.2 relative motion sensors are operatively connected to a signal processor 38 by which a discrimination algorithm discriminates the type of crash from the first signal 40.1, and discriminates the severity of the crash from the second signal 40.2.

Figure 4:
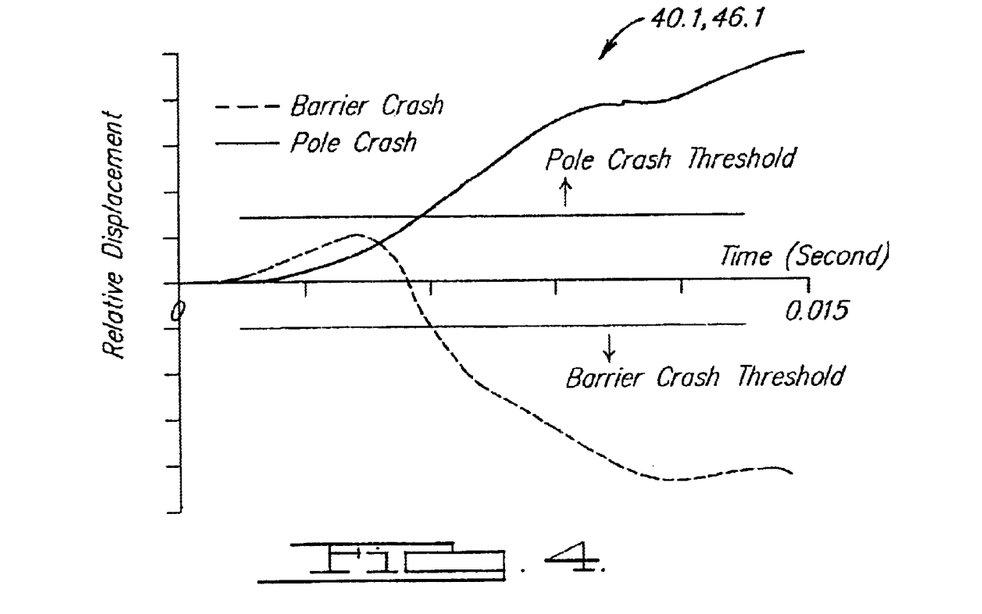
FIG. 4 illustrates for various crashes the discrimination of object type from the relative displacement signal of the first relative motion sensor.

Referring to FIG. 4, one example of an associated crash type discrimination algorithm, a relative displacement 46.1 measurement from the first relative motion sensor 14.1 is compared with respective thresholds in both the positive and negative directions of relative motion, wherein the particular threshold values are dependent upon the characteristics of the particular vehicle 12. In the example of FIG. 4 for a side-impact crash, if the relative displacement 46.1 is greater than the positive threshold, then the crash type is assumed to be a pole crash; whereas if the relative displacement 46.1 is less than the negative threshold, then the crash type is assumed to be a barrier crash.

Figure 5:
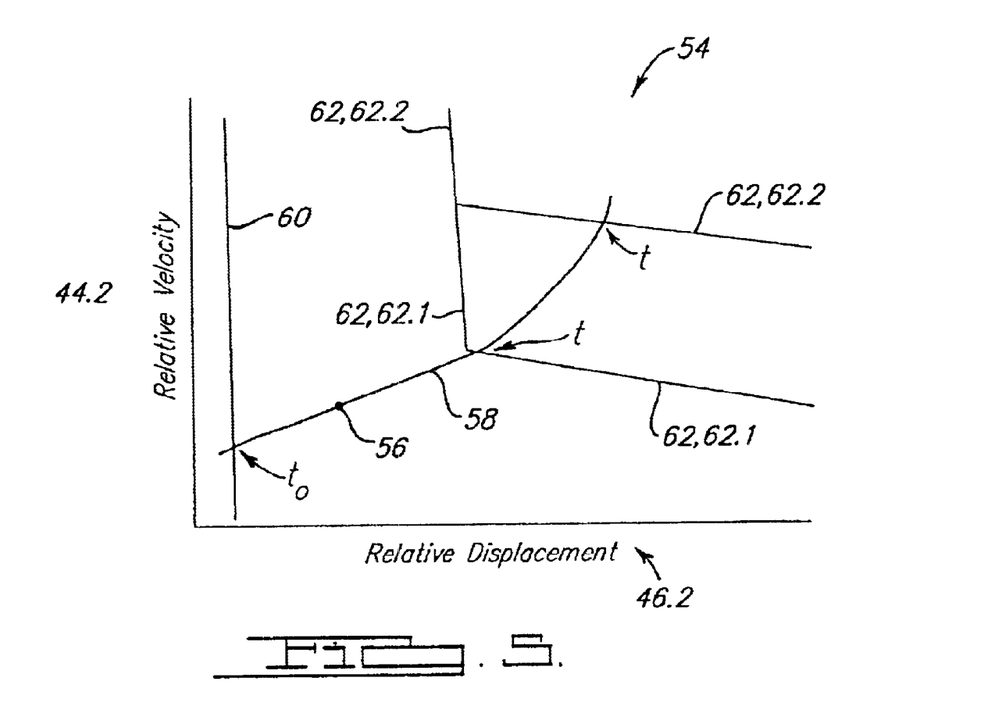
FIG. 5 illustrates for various crashes the discrimination of crash severity using a measure in phase space from a second relative motion sensor.

Referring to FIG. 5, in one example of an associated crash severity discrimination algorithm, the relative motion measurement from the second relative motion sensor 14.2 is discriminated in the 2-D phase space 54 having coordinates of relative velocity 44.2 and relative displacement 46.2. A variable point 56 in this phase space 54 given by the coordinates of relative velocity 44.2 and relative displacement 46,2 as measured by the second relative motion sensor 14.2 generally moves along a trajectory 58 in phase space 54 with respect to time. The time at which the variable point 56 crosses a first threshold boundary 60 is stored as a first time $t_0$. If the trajectory 58 subsequently crosses a second threshold boundary 62 within a period of time since the first time $t_0$ that is less than a threshold, then the safety restraint system 36 is activated. Generally, the second threshold boundary 62 is dependent upon the crash type discriminated from the first signal 40.1. For example, FIG. 5 illustrates two particular crash-type dependent second threshold boundaries 62.1, 62.2 having different associated velocity thresholds, one of the second threshold boundaries 62.1 corresponding to a pole crash and the other of second threshold boundaries 62,2 corresponding to a barrier crash, wherein it is assumed that a discrimination threshold to activate the safety restraint system 36 responsive to a pole impact is lower than that responsive to a barrier impact for the equivalent occupant injury severity level. The specific locations of the particular second threshold boundaries 62.1, 62.2 are dependent upon the structural characteristics of the particular vehicle 12.

As an example of one embodiment, a side-impact crash sensing system 10 can be implemented as a distributed sensor system comprising associated principal 64 and satellite 66 sensors, wherein the first relative motion sensor 14.1 for sensing the crash type (i.e. the type of impacting object, e.g. barrier or pole) acts as the satellite sensor 66 and the second relative motion sensor 14.2 for sensing crash severity acts as the principal sensor 64, wherein the principal sensor 64 further incorporates a signal processor 38 for processing the respective first 40 and second 48 signals from the first 14.1 and second 14.2 relative motion sensors. The principal 64 and satellite 66 sensors can be developed separately, and then integrated into the distributed sensor system.

Figure 6A:
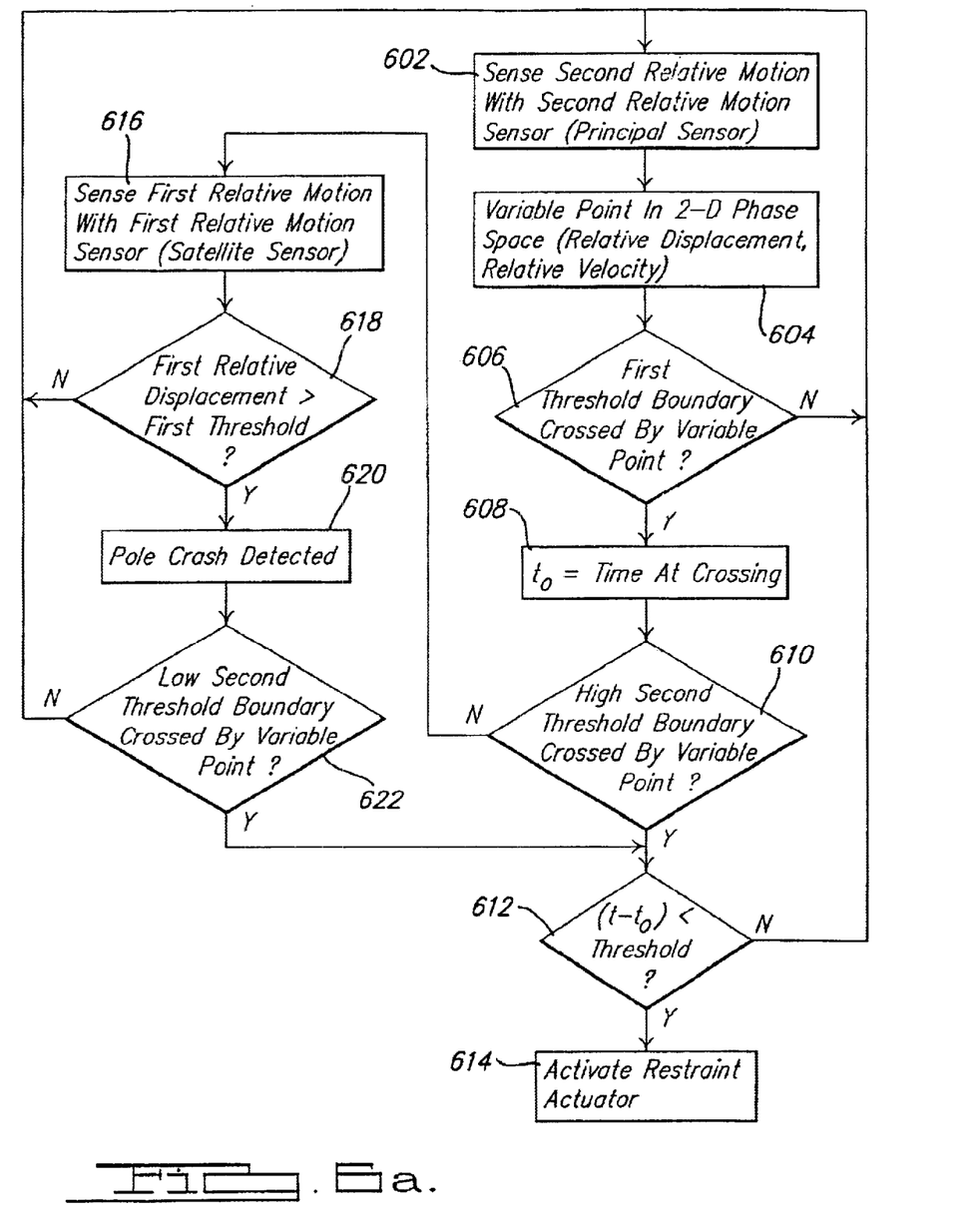
FIG. 6a illustrates a flow chart of a first example of a method of sensing a vehicle crash.
Figure 6B:
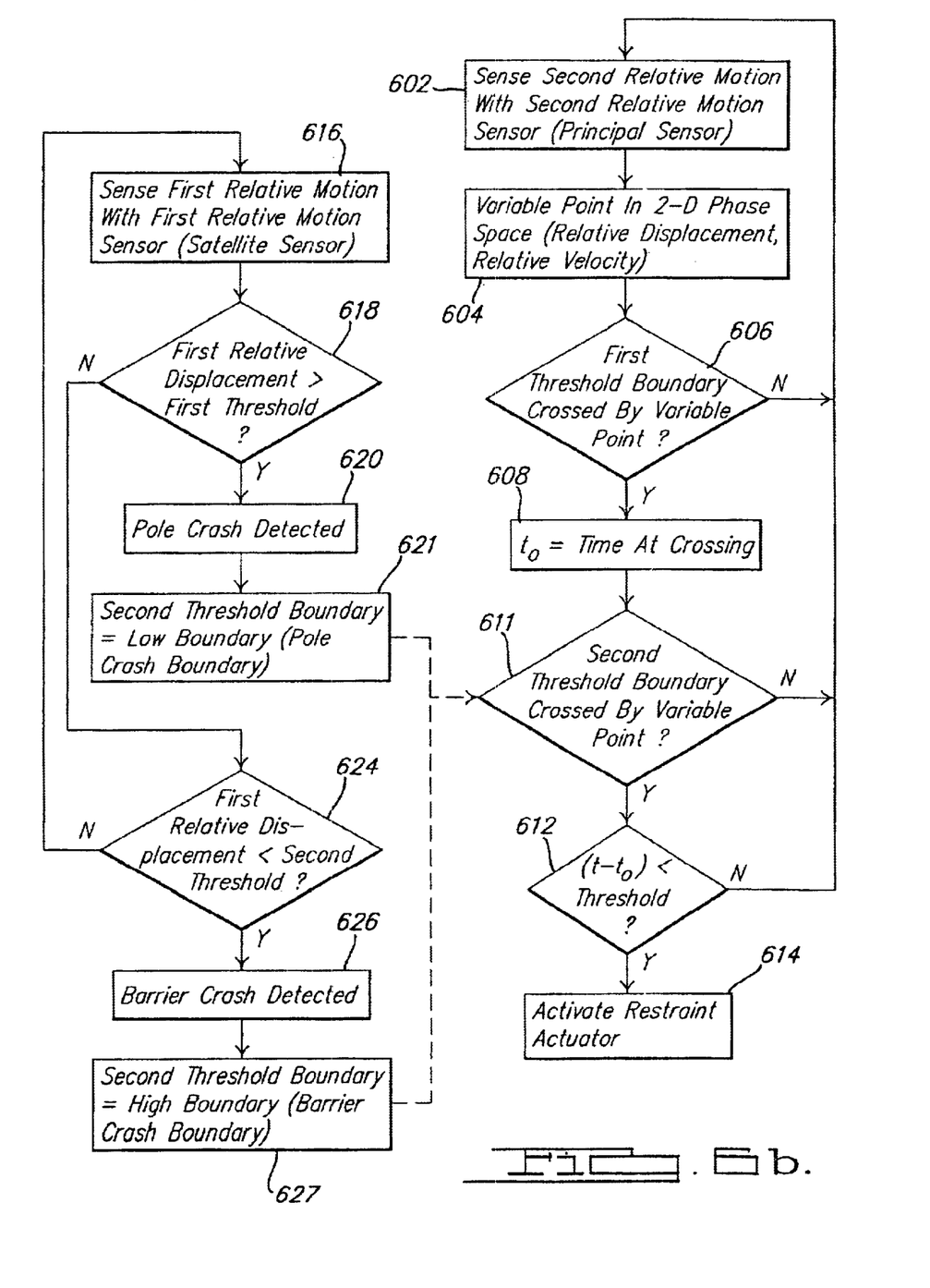
FIG. 6b illustrates a flow chart of a second example of a method of sensing a vehicle crash.

Referring to FIGS. 6a and 6b, the satellite sensor detects the type of object which determines which crash severity threshold curve to use in discriminating the crash, and the principal sensor detects a measure of crash severity and compares this with the crash object dependent crash severity threshold, wherein when the measure of crash severity exceeds the crash object dependent crash severity, the associated side air bag safety restraint system is activated (fired).

Referring to FIG. 6a, in accordance with a first example of a method of discriminating a crash, in step (602), the second relative motion sensor 14.2 generates a second signal 40.2 responsive to the relative motion measured thereby of first 16 and second 18 elements of a vehicle at a second location 20.2 for which the relative motion exhibits similar behavior for different crash types. In step (604), the second signal 40.2 provides, or is processed to provide, the associated relative velocity 44.2 and relative displacement 46.2 of a variable point 56 in an associated phase space 54 of relative velocity and relative displacement. If, in step (606), the variable point 56 crosses a first threshold boundary 60 in the phase space 54, then in step (608) the time when the variable point 56 crosses a first threshold boundary 60 is stored as $t_0$. Otherwise from step (606) the process repeats with step (602). Following step (608), in step (610), if the variable point 56 crosses a second threshold boundary 62.2 having a relatively high threshold level that would be appropriate responsive to a barrier crash, and if, in step (612), the second threshold boundary 62.2 is crossed at a time t that is within a threshold period following time $t_0$, then in step (614) the associated safety restraint system 36 is activated. Otherwise from step (612) the process repeats with step (602). Otherwise from step (610), in step (616) the first relative motion sensor 14.1 generates a first signal 40.1 responsive to the relative motion measured thereby of first 16 and second 18 elements of a vehicle at a first location 20.1 for which the relative motion exhibits different behavior for different crash types. If, in step (618), the relative displacement 46.1 sensed by the first relative motion sensor 14.1 is greater than a first threshold, then in step (620) a pole crash is assumed to have been detected. Then, in step (622), if the variable point 56 crosses a second threshold boundary 62.1 having a relatively low threshold level that would be appropriate responsive to a pole crash, and if, in step (612), the second threshold boundary 62.1 is crossed at a time t that is within a threshold period following time $t_0$, then in step (614) the associated safety restraint system 36 is activated.

Referring to FIG. 6b, in accordance with a second example of a method of discriminating a crash, in step (602), the second relative motion sensor 14.2 generates a second signal 40.2 responsive to the relative motion measured thereby of first 16 and second 18 elements of a vehicle at a second location 20.2 for which the relative motion exhibits similar behavior for different crash types. In step (604), the second signal 40.2 provides, or is processed to provide, the associated relative velocity 44.2 and relative displacement 46.2 of a variable point 56 in an associated phase space 54 of relative velocity and relative displacement. If, in step (606), the variable point 56 crosses a first threshold boundary 60 in the phase space 54, then in step (608) the time when the to variable point 56 crosses a first threshold boundary 60 is stored as $t_0$. Otherwise from step (606) the process repeats with step (602). Following step (608), in step (611) if the variable point 56 crosses a second threshold boundary 62, and if, in step (612), the second threshold boundary 62 is crossed at a time t that is within a threshold period following time $t_0$, then in step (614) the associated safety restraint system 36 is activated. Otherwise from step (611) the process repeats with step (602).

The second threshold boundary 62 used in step (611) is determined by an independent process beginning with step (616), wherein the first relative motion sensor 14.1 generates a first signal 40.1 responsive to the relative motion measured thereby of first 16 and second 18 elements of a vehicle at a first location 20.1 for which the relative motion exhibits different behavior for different crash types. If, in step (618), the relative displacement 46.1 sensed by the first relative motion sensor 14.1 is greater than a first threshold, then in step (620) a pole crash is assumed to have been detected and in step (621) the second threshold boundary 62 is set to a second threshold boundary 62.1 having a relatively low threshold level that would be appropriate responsive to a pole crash. Otherwise from step (618), if, in step (624), the relative displacement 46.1 sensed by the first relative motion sensor 14.1 is less than a second threshold, then, in step (626), a barrier crash is assumed to have been detected and in step (627) the second threshold boundary 62 is set to a second threshold boundary 62.2 having a relatively high threshold level that would be appropriate responsive to a barrier crash.

In accordance with one aspect, the crash sensing system 10 uses one or more relative motion measures that are responsive to a one-dimensional component of generally three-dimensional motion. Referring to FIGS. 7a, 7b, 8 and 9, this one-dimensional component of relative motion may be measured with a bar code relative motion sensor 70 that, for example, uses a light beam 72—for example, a laser beam—as a source of illumination. The bar code relative motion sensor 70 generally comprises a bar code module 74 and light beam emitter 76, for example, a laser, each attached to one of two adjoining structural components that slip relative to each other under impact. A bar code 78 is illuminated by the light beam 72 forming a line of light 80, and the light that is either transmitted or reflected—depending upon the type of bar code module 74—by a detector 88 is detected by the bar code module 74 to provide a signal that indicates the position of the light beam 72 along the bar code 78.

Figure 7A:
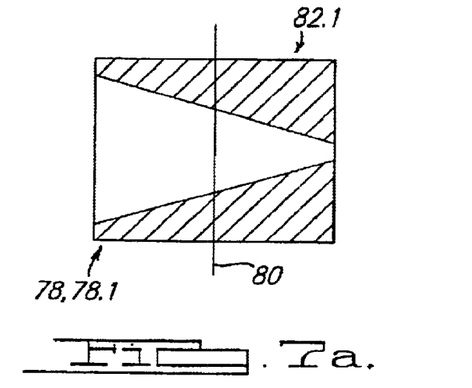
FIG. 7a illustrates a first exemplary bar code format.

Referring to FIG. 7a, exhibiting a first exemplary bar code format 82.1 referred to as type A, the bar code 78.1 comprises a reflecting or transmitting patch that is shaped so that the amount of light reflected or transmitted by the bar code 78.1 is dependent upon the location of the light beam 72 along the bar code 78.1. Accordingly, the type A bar code 78.1 provides an analog signal responsive to the position of the light beam 72 relative to the bar code 78.1.

Figure 7B:
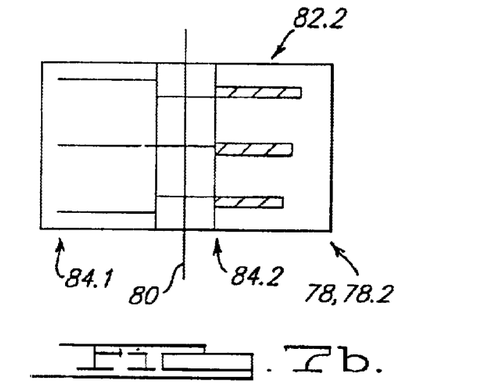
FIG. 7b illustrates a second exemplary bar code format.

Referring to FIG. 7b, exhibiting a second exemplary bar code format 82.2 referred to as type B, the bar code 78.2 comprises a spatially modulated reflective or transmissive pattern, wherein either the amount of light reflected or transmitted by the bar code 78.2 is dependent upon the location of the light beam 72 along the bar code 78.2, for example, by spatial pulse width modulation of the pattern as a function of the relative position of the bar code 78.2 and the light beam 72; or the spatial modulation pattern of the light signal along the light beam 72 in a direction transverse to the direction of relative motion provides a digital signal that indicates the position of the light beam 72 relative to the bar code 78. The pattern illustrated in FIG. 7b contains three distinct patterns that inherently provide for object type discrimination in accordance with the crash discrimination algorithm of the first relative motion sensor 14.1, wherein a crash is indicated if the light beam 72 is deflected beyond the central bar code region, for example, corresponding to a barrier type crash if the light beam 72 is deflected to a first bar code pattern 84.1 on one side, and, for example, a pole type crash if the light beam 72 is deflected to a second bar code pattern 84.2 on the other side.

Figure 8:
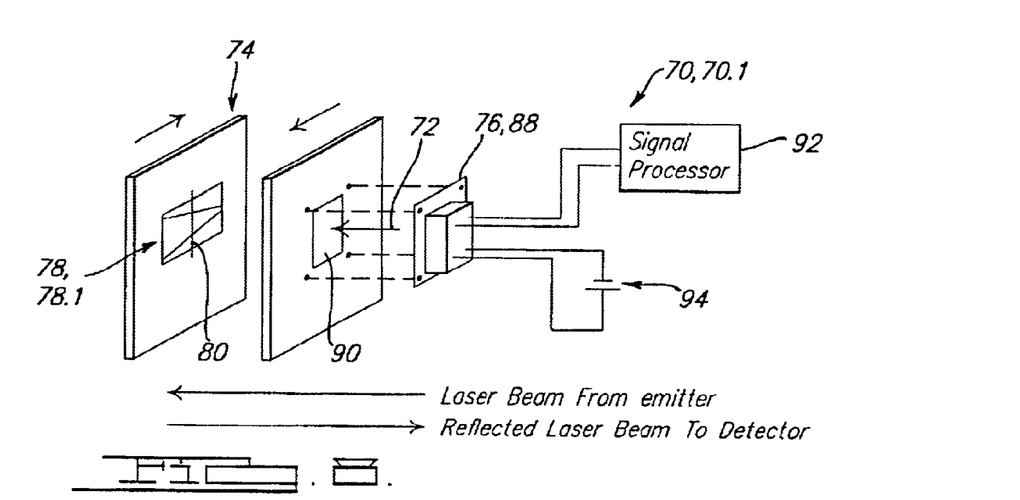
FIG. 8 illustrates a first bar code relative motion sensing system that operates on light reflected by a bar code.

Referring to FIG. 8, in a first bar code relative motion sensor 70.1, the light beam 72 from a light beam emitter 76, for example, operatively coupled to one of the door edge 28 and a proximal portion of a proximate pillar 26, is reflected off the bar code 78 operatively coupled to the other of the proximal portion of a proximate pillar 26 and the door edge 28, and received by an optical detector that is relatively fixed with respect to the light beam emitter 76.

Figure 9:
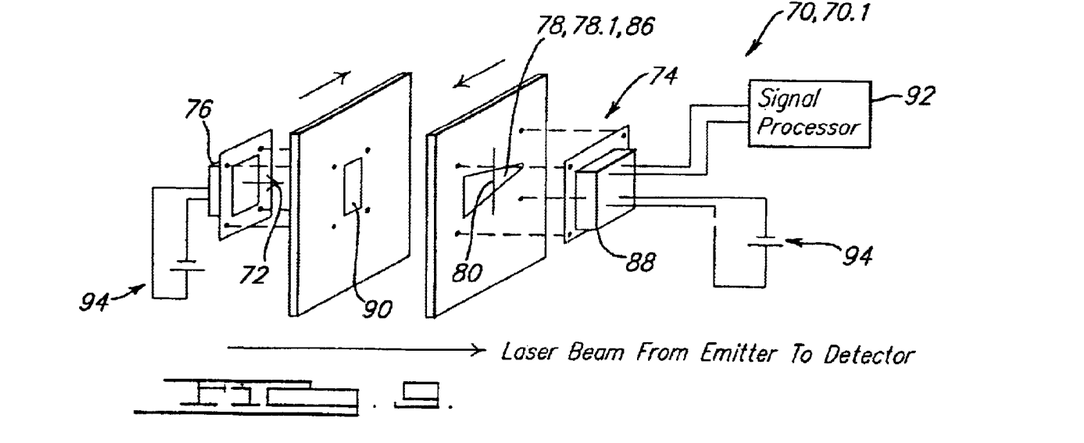
FIG. 9 illustrates a first bar code relative motion sensing system that operates on light transmitted through a bar code.

Referring to FIG. 9, in a second bar code relative motion sensor 70.2, the bar code 78 is adapted in the form of an optical window, or bar code window 86, that is interposed between a light beam emitter 76 and an associated optical detector 88, wherein the light beam 72 emitted by the light beam emitter 76 through a second optical window 90 is transmitted through and modulated by the bar code window 86 and is then received by the optical detector 88, whereby, for example, the bar code window 86 is operatively coupled to one of the door edge 28 and a proximal portion of a proximate pillar 26 and the light beam emitter 76 is operatively coupled to the other of the proximal portion of a proximate pillar 26 and the door edge 28.

In either of the exemplary bar code relative motion sensors 70.1, 70.2 illustrated in FIGS. 8 and 9, the relative motion between the door edge 28 and the pillar edge 30 responsive to the crash is generally three-dimensional, whereas the bar code relative motion sensor 70 substantially detects the component of relative motion along one dimension.

Either type of bar code format 82.1, 82.2 can be incorporated in the first relative motion sensor 14.1 described hereinabove. Along with the lateral component direction of the relative motion of door edge 28 to pillar edge 30, the broad bumper/barrier impact causes a change in the lateral motion direction to switch within a few milliseconds, while the concentrated high pole impact, extending along vehicle 12 side up to the roof line, doesn't cause the change in direction of lateral motion. With the type A bar code format 82.1, the relative motion is sensed from the magnitude of the detected light beam 72 signal whereas with the type B bar code format 82.2, the relative motion is sensed from changes in the bar density responsive to which bar code pattern is illuminated by the light beam 72. The type A bar code format 82.1 may provide for faster object-type recognition by an algorithm that is responsive to relative velocity 44 and/or relative displacement 46.

Generally, the type A bar code format 82.1 is preferred for the second relative motion sensor 14.2, which, for example, senses the lateral component of transient relative motion of door edge 28 relative to the pillar edge 30 responsive to side-impact and generates a corresponding analog signal. The analog signal is processed to provide measures of both the relative displacement 46 and the relative velocity 44, from which a measure of crash severity is determined.

The bar code relative motion sensor 70 generally comprises a light beam emitter 76, an optical detector 88, an optical bar code 78, a signal processor 92, and a power supply 94. The light beam emitter 76, bar code 78, and optical detector 88 are operatively coupled to structural elements so that relative motion therebetween is measured by the detection of corresponding relative motion of the light beam 72 from the light beam emitter 76, relative to the optical bar code 78. Whereas the light beam 72 is preferably generated with a laser source, one of ordinary skill in the art will recognize that other light sources can be used for this purpose, for example, a light emitting diode (LED). In the event of impact on one or both pieces of structure, the relative motion of the light beam 72 relative to the bar code 78, detected by the optical detector 88, generates a change in voltage, or signal 96, from the initial value, and/or directional identification from bar code pattern. This change in voltage is calibrated with respect to the distance and direction of relative motion. This signal 96 is then fed to the signal processor 92, for example, a microprocessor, and used by an algorithm to detect—depending upon the location of the relative motion sensor—the type of impacting object and/or the crash severity. A type of object is classified based upon concentrated versus distributed load by means of relative voltage or signal type from bar code patterns. The crash severity is measured in the phase space 54 of relative velocity 44.2 vs. relative displacement 46.2 as determined from the signal from the relative motion sensor.

Figure 10:
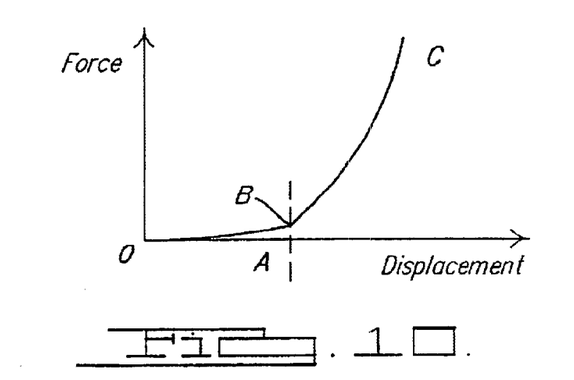
FIG. 10 illustrates a force-deflection characteristic of a side door in a vehicle.
Figure 11:
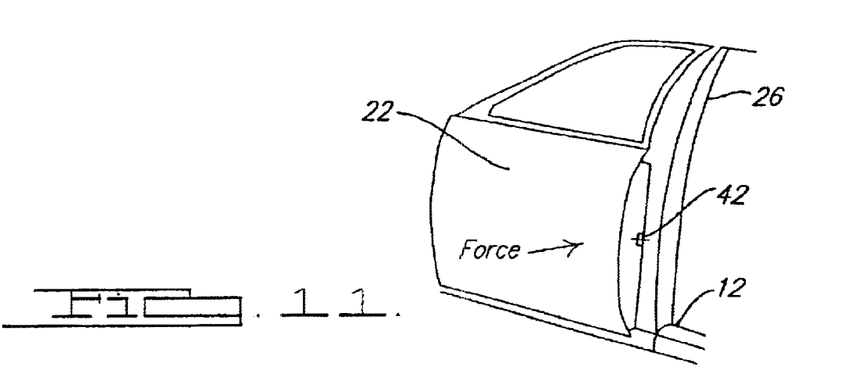
FIG. 11 illustrates a vehicle side door geometry in accordance with FIG. 10.

Referring to FIGS. 10 and 11, illustrating the force deflection characteristics of a vehicle side door/pillar structure, a static load applied to the side door/pillar structure at a given location causes an associated deflection, first in accordance with an elastic deflection characteristic in the region O-A, and then in accordance with a plastic deflection characteristic associated with buckling, in the region A-C, wherein the nature of the deflection characteristic changes from elastic to plastic at point B on the curve, The elastic deformation characteristic may, for example, result from the interaction of the door 22 with rubber, or other compliant components between the door 22 and the pillar 26, as the door moves towards the pillar 26. The extent of the elastic region, i.e. the length of O-A, varies with location along the height of the door 22 on the pillar 26, and is diminished proximate to the location of the striker-latch 42.

The crash sensing system 10 is, for example, adapted to discriminate impacting object type within the elastic region of door deflection. Responsive to a crash, the impacted door 22, as a whole, is pushed towards the pillar 26 within the elastic zone, and the striker moves within the latch. After the striker bottoms out against the latch, then if the impact is from a relatively low, broad object or barrier, for example, the front of a striking vehicle 98 shown in FIG. 12 wherein the bumper 102 thereof first strikes the door 22 of the vehicle 12 at a level 104 that is a distance H below the striker-latch 42, the continued offset force of impact from the object causes the door 22 to rotate about the bottomed-out striker-latch 42, which causes the top of the door 22 to move laterally outwards from the vehicle 12, away from the pillar 26, while the bottom of the door 22 continues to move laterally inwards, towards the pillar 26. However, if the impact is from an object that extends the height of the door 22, for example, a pole, then the impacting force is balanced above and below the striker-latch 42 so that the motion of the both the top and bottom portions of the door 22 are both laterally inwards, towards the pillar 26. The door 22 moves responsive to the elastic deflection characteristic before the commencement of buckling. Accordingly, by monitoring the relative motion during the elastic deflection phase at a point above the striker-latch 42, the crash sensing system 10 provides for relatively quick—for example, within 5 milliseconds—recognition of impacting objects in crashes that can result in injury to the occupant.

The elastic deformation characteristic of the side vehicle structure can also be utilized to discriminate the geometry of an impacting vehicle, for example, so as to determine when a the front of a relatively large vehicle such as a pickup truck impacts the side of a relatively small vehicle such as a compact passenger car. Such crashes for which the respective vehicle sizes are incompatible, particularly when a large vehicle having a relatively high bumper impacts a relatively small vehicle, are generally more aggressive and can increase the severity of injuries to an occupant in the impacted vehicle 12. If the relatively high bumper of the impacting vehicle impacts relatively close to the striker-latch 42 of the relatively small impacted vehicle 12, the resulting impact resembles that of a pole crash with respect to door rotation about the striker-latch 42 and the nature of the resulting relative displacement 46 of the door 22 with respect to the pillar 26 at locations above the striker-latch 42. Accordingly, such a crash would be discriminated as a pole-type crash, which is an appropriate response because both the impact from a relatively large vehicle and the impact with a pole are relatively severe side-impact crash events requiring a similar control of the side-impact air bag system to mitigate occupant injury.

Figure 12:
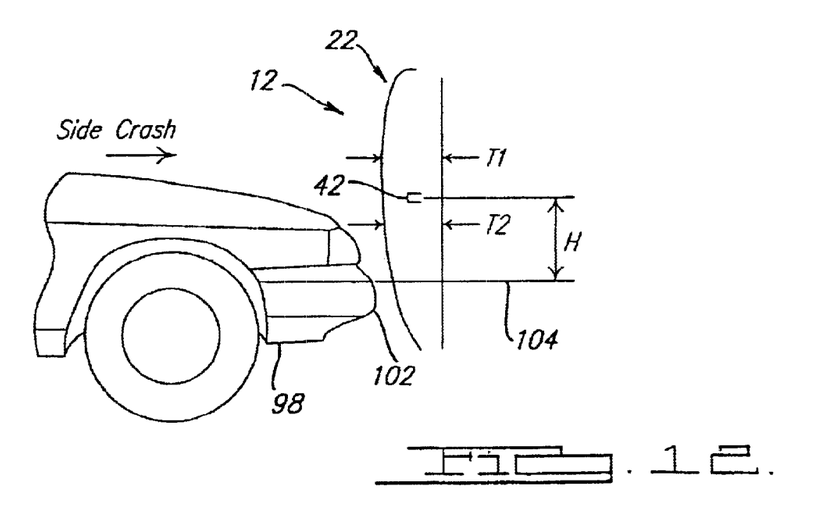
FIG. 12 illustrates the geometry of an impacting vehicle impacting an impacted vehicle 12.

The particular preferable locations of the relative motion sensors of the instant invention are dependent upon the structural characteristics of the particular vehicle 12 upon which the crash sensing system 10 is installed. The object type discrimination capability of the system can be diminished for some door geometries relative to others, for example, if the lower portion of the door 22 is relatively thick compared with the upper portion of the door 22, i.e if T2 measured below the striker-latch 42 is sufficiently larger than T1 measured above the striker-latch 42, as illustrated in FIG. 12, wherein different types of objects, for example, barrier vs. pole objects, have a lesser effect on door rotation. Another factor that can diminish performance is if the door 22 is supported by elements, in addition to the striker-latch 42, that might prevent or diminish door rotation responsive to barrier-type impacts.

Whereas the crash sensing system 10 has been illustrated in the application of side-impact crash detection for both distinguishing types of objects and for measuring crash severity, one of ordinary skill in the art will recognize that the teachings herein can be applied to other crash sensing systems for which impacts from different types of object cause distinguishably different deformation characteristics for at least one location of resulting relative motion of the structure being impacted, and the deformation characteristic is similar for different objects and responsive to the severity of the impact for at least one other location of resulting relative motion.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A vehicle crash sensing system, comprising a first relative motion sensor operatively coupleable to the vehicle proximate to a first location, wherein when operatively coupled to the vehicle, said first relative motion sensor is responsive to a first relative motion of a first element of the vehicle with respect to a second element of the vehicle proximate to said first location, and said first location is adapted so that said first relative motion proximate to said first location is unipolar for at least one type of crash, and said first relative motion proximate to said first location is bipolar for at least another type of crash.

2. A vehicle crash sensing system as recited in claim 1, further comprising a second relative motion sensor operatively coupleable to the vehicle proximate to a second location, wherein when operatively coupled to the vehicle, said second relative motion sensor is responsive to a second relative motion of said first element of the vehicle with respect to said second element of the vehicle proximate to said second location, and said second location is adapted so that said second relative motion proximate to said second location is unipolar for both said at least one type of crash and said at least another type of crash.

3. A vehicle crash sensing system as recited in claim 2, further comprising a processor operatively connected to said first and second relative motion sensors, wherein said processor discriminates a type of crash responsive to a first signal from said first relative motion sensors and said first signal is responsive to said first relative motion.

4. A vehicle crash sensing system as recited in claim 3, wherein said processor discriminates a type of crash by comparison of a relative displacement of said first relative motion with at least one first threshold.

5. A vehicle crash sensing system as recited in claim 2, further comprising a processor operatively connected to said first and second relative motion sensors, wherein said processor discriminates a severity of said vehicle crash responsive to a second signal from said second relative motion sensor, wherein said second signal is responsive to said second relative motion.

6. A vehicle crash sensing system as recited in claim 5, wherein said processor discriminates a severity of said vehicle crash by comparing a variable point in phase space with at least one threshold boundary in said phase space, and said phase space comprises a first coordinate of relative velocity of said second relative motion and a second coordinate of relative displacement of said second relative motion.

7. A vehicle crash sensing system as recited in claim 6, wherein at least one said threshold boundary is responsive to said type of crash.

8. A vehicle crash sensing system as recited in claim 6, further comprising a safety restraint system, wherein said safety restraint system is capable of mitigating injury to an occupant of the vehicle from a vehicle crash to which the vehicle crash sensing system is responsive, and said processor generates a signal for controlling the actuation of said safety restraint system responsive to the operation of comparing a variable point in phase space with at least one threshold boundary in said phase space.

9. A vehicle crash sensing system as recited in claim 2, wherein one of said first and second elements comprises a vehicle door, the other of said first and second elements comprises a fixed portion of the vehicle proximate to said vehicle door, and said first location is above a door latch of said vehicle door.

10. A vehicle crash sensing system as recited in claim 2, wherein one of said first and second elements comprises a vehicle door, the other of said first and second elements comprises a fixed portion of the vehicle proximate to said vehicle door, and said second location is at or below a door latch of said vehicle door.

11. A vehicle crash sensing system as recited in claim 10, wherein said second location is proximate to a reinforcement beam of said vehicle door.

12. A vehicle crash sensing system as recited in claim 2, wherein said first relative motion sensor is principally responsive to a one-dimensional component of relative motion along a first direction, and said second relative motion sensor is principally responsive to a one-dimensional component of relative motion along a second direction.

13. A vehicle crash sensing system as recited in claim 12, wherein said first and second directions are substantially the same.

14. A vehicle crash sensing system as recited in claim 13, wherein said first and second directions are substantially aligned with an anticipated direction of the vehicle crash.

15. A vehicle crash sensing system, comprising:
   a. a first relative motion sensor operatively coupleable to the vehicle proximate to a first location, wherein when operatively coupled to the vehicle, said first relative motion sensor is responsive to a first relative motion of a first element of the vehicle with respect to a second element of the vehicle proximate to said first location, and said first location is adapted so that said first relative motion proximate to said first location is unipolar for at least one type of crash, and said first relative motion proximate to said first location is bipolar for at least another type of crash; and
   b. a second relative motion sensor operatively coupleable to the vehicle proximate to a second location, wherein when operatively coupled to the vehicle, said second relative motion sensor is responsive to a second relative motion of said first element of the vehicle with respect to said second element of the vehicle proximate to said second location, and said second location is adapted so that said second relative motion proximate to said second location is unipolar for both said at least one type of crash and said at least another type of crash; wherein at least one of said first and second relative motion sensors comprise a bar code relative motion sensor.

16. A vehicle crash sensing system as recited in claim 15, wherein said bar code relative motion sensor comprises:
   a. a light beam operatively coupled to one of said first and second elements of the vehicle;
   b. a bar code operatively coupled to the other of said first and second elements of the vehicle, wherein said bar code is illuminated by said light beam; and c. an optical detector positioned to receive light from said light bean illuminating said bar code.

17. A vehicle crash sensing system as recited in claim 16, wherein said bar code is illuminated by said light beam over an area of illumination, said area of illumination is less than a total area of said bar code, said bar code comprises a combination of a first value and a second value of an optical property, said optical property is selected from a reflectance and a transmittance, and an integral of said optical property over said area of illumination is responsive to a relative position of said area of illumination with respect to said bar code.

18. A vehicle crash sensing system as recited in claim 17, wherein said combination of said first and second values is adapted so that said integral varies continuously with respect to said relative position.

19. A vehicle crash sensing system as recited in claim 17, wherein said combination of said first and second values is adapted so that said integral is discontinuous with respect to said relative position.

20. A method of sensing a vehicle crash, comprising:
  a. measuring proximate to a first location a first relative motion of a first element of the vehicle with respect to a second element of the vehicle proximate to said first location, said first location is adapted so that said first relative motion proximate to said first location is unipolar for at least one type of crash, and said first relative motion proximate to said first location is bipolar for at least another type of crash; and
  b. measuring proximate to a second location a second relative motion of said first element of the vehicle with respect to said second element of the vehicle proximate to said second location, said second location is adapted so that said second relative motion proximate to said second location is unipolar for both said at least one type of crash and said at least another type of crash.

21. A method of sensing a vehicle crash as recited in claim 20, further comprising an operation of discriminating a type of crash from said first relative motion.

22. A method of sensing a vehicle crash as recited in claim 21, wherein the operation of discriminating a type of crash comprises comparing a relative displacement of said first relative motion with at least one first threshold.

23. A method of sensing a vehicle crash as recited in claim 20, further comprising an operation discriminating a severity of said vehicle crash from said second relative motion.

24. A method of sensing a vehicle crash as recited in claim 23, wherein the operation of discriminating a severity of said vehicle crash comprises comparing a variable point in phase space with at least one threshold boundary in said phase space, and said phase space comprises a first coordinate of relative velocity of said second relative motion and a second coordinate of relative displacement of said second relative motion.

25. A method of sensing a vehicle crash as recited in claim 24, wherein at least one said threshold boundary is responsive to said type of crash.

26. A method of sensing a vehicle crash as recited in claim 24, further comprising an operation of generating a signal for controlling the actuation of a safety restraint system responsive to the operation of comparing a variable point in phase space with at least one threshold boundary in said phase space.

27. A method of sensing a vehicle crash as recited in claim 26, wherein the operation of comparing said variable point in phase space with at least one threshold boundary in said phase space comprises:
  a. comparing said variable point in phase space with a first threshold boundary in phase space;
  b. storing a first time when said variable point crosses said first threshold boundary;
  c. comparing said variable point in phase space with a second threshold boundary in phase space;
  d. comparing a time associated with said variable point with said first time; and
  e. generating signal for activating said safety restraint system if said variable point crosses said second threshold boundary and if said time associated with said variable point exceeds said first time by less than a second threshold.

28. A method of sensing a vehicle crash as recited in claim 27, wherein said second threshold boundary is responsive to said type of crash.

29. A method of sensing a vehicle crash as recited in claim 20, wherein one of said first and second elements comprises a vehicle door, the other of said first and second elements comprises a fixed portion of the vehicle proximate to said vehicle door, and said first location is above a door latch of said vehicle door.

30. A method of sensing a vehicle crash as recited in claim 20, wherein one of said first and second elements comprises a vehicle door, the other of said first and second elements comprises a fixed portion of the vehicle proximate to said vehicle door, and said second location is at or below a door latch of said vehicle door.

31. A method of sensing a vehicle crash as recited in claim 30, wherein said second location is proximate to a reinforcement beam of said vehicle door.

32. A method of sensing a vehicle crash as recited in claim 20, wherein said first relative motion is measured as a one-dimensional component of relative motion along a first direction, and said second relative motion is measured as a one-dimensional component of relative motion along a second direction.

33. A method of sensing a vehicle crash as recited in claim 32, wherein said first and second directions are substantially the same.

34. A method of sensing a vehicle crash as recited in claim 33, wherein said first and second directions are substantially aligned with an anticipated direction of the vehicle crash.

35. A method of sensing a vehicle crash, comprising:
  a. measuring a relative motion of a first element of the vehicle with respect to a second element of the vehicle; and
  b. discriminating a severity of said vehicle crash from said relative motion, wherein the operation of discriminating a severity of said vehicle crash comprises comparing a variable point in phase space with at least one threshold boundary in said phase space, and said phase space comprises a first coordinate of relative velocity of said relative motion and a coordinate of relative displacement of said second relative notion.

36. A method of sensing a vehicle crash as recited in claim 35, further comprising an operation of generating a signal for controlling the actuation of a safety restraint system responsive to the operation of comparing a variable point in phase space with at least one threshold boundary in said phase space.

37. A method of sensing a vehicle crash as recited in claim 36, wherein the operation of comparing said variable point in phase space with at least one threshold boundary in said phase space comprises:
  a. comparing said variable point in phase space with a first threshold boundary in phase space;

b. storing a first time when said variable point crosses said first threshold boundary;

c. comparing said variable point in phase space with a second threshold boundary in phase space;

d. comparing a time associated with said variable point with said first time; and e. generating signal for activating said safety restraint system if said variable point crosses said second threshold boundary and if said time associated with said variable point exceeds said first time by less than a second threshold.

38. A vehicle crash sensor, comprising a bar code relative motion sensor operatively coupled to the vehicle, wherein said bar code relative motion sensor is adapted to measure a relative motion of a first element of the vehicle relative to a second element of the vehicle, said second element is adapted to be proximate to said first element, and said relative motion is responsive to a crash involving either said first element or said second element of said vehicle.

39. A vehicle crash sensor as recited in claim 38, wherein said bar code relative motion sensor comprises:

a. a light beam operatively coupled to one of said first and second elements of the vehicle;

b. a bar code operatively coupled to the other of said first and second elements of the vehicle, wherein said bar code is illuminated by said light beam; and c. an optical detector positioned to receive light from said light beam illuminating said bar code.

40. A vehicle crash sensor as recited in claim 39, wherein said bar code is illuminated by said light beam over an area of illumination, said area of illumination is less than a total area of said bar code, said bar code comprises combination of a first value and a second value of an optical property, said optical property is selected from a reflectance and a transmittance, and an integral of said optical property over said area of illumination is responsive to a relative position of said area of illumination with respect to said bar code.

41. A vehicle crash sensor as recited in claim 40, wherein said combination of said first and second values is adapted so that said integral varies continuously with respect to said relative position.

42. A vehicle crash sensor as recited in claim 40, wherein said combination of said first and second values is adapted so that said integral is discontinuous with respect to said relative position.

* * * * *

UNITED STATES PATENT AND TRADEMARK OFFICE
CERTIFICATE OF CORRECTION

PATENT NO. : 6,644,688 B1
DATED : November 11, 2003
INVENTOR(S) : Hu et al.

It is certified that error appears in the above-identified patent and that said Letters Patent is hereby corrected as shown below:

Column 3,
Line 18, delete "202" and replace with -- 20.2 --

Column 4,
Line 9, delete "62,2" and replace with -- 62.2 --

Column 5,
Line 22, after "the" delete "to"

Column 8,
Line 28, delete "a"

Column 12,
Line 54, after "a" insert -- second --
Line 55, after "said" delete "second"

Signed and Sealed this

Fourth Day of January, 2005

JON W. DUDAS
*Director of the United States Patent and Trademark Office*